(12) United States Patent
Myer et al.

(10) Patent No.: US 11,117,478 B2
(45) Date of Patent: Sep. 14, 2021

(54) CHARGING INLET WITH THERMAL SENSOR

(71) Applicant: TE CONNECTIVITY CORPORATION, Berwyn, PA (US)

(72) Inventors: Nathan Philip Myer, Lancaster, PA (US); Zachary Wood Lyon, Lewisville, NC (US); Jeremy Christian Patterson, Winston-Salem, NC (US)

(73) Assignee: TE Connectivity Corporation, Berwyn, PA (US)

(*) Notice: Subject to any disclaimer, the term of this patent is extended or adjusted under 35 U.S.C. 154(b) by 0 days.

(21) Appl. No.: 16/139,322

(22) Filed: Sep. 24, 2018

(65) Prior Publication Data

US 2020/0094689 A1    Mar. 26, 2020

(51) Int. Cl.

| | | |
|---|---|---|
| *H02J 7/00* | (2006.01) | |
| *B60L 53/16* | (2019.01) | |
| *H01R 13/00* | (2006.01) | |
| *G01K 1/14* | (2006.01) | |
| *H01R 13/627* | (2006.01) | |
| *H01R 13/639* | (2006.01) | |
| *H01R 13/66* | (2006.01) | |

(52) U.S. Cl.
CPC ............... *B60L 53/16* (2019.02); *G01K 1/14* (2013.01); *H01R 13/6275* (2013.01); *H01R 13/639* (2013.01); *H01R 13/6683* (2013.01); *H02J 7/007* (2013.01); *H01R 2201/26* (2013.01)

(58) Field of Classification Search
CPC ...... H02J 7/007; B60L 53/16; H01R 13/6275; H01R 13/639; H01R 13/6683; H01R 2201/26; G01K 1/14

USPC .......................................... 320/109, 108, 104
See application file for complete search history.

(56) References Cited

U.S. PATENT DOCUMENTS

| | | | | |
|---|---|---|---|---|
| 3,601,679 A | * | 8/1971 | Braun ................... | H02J 7/0091 320/114 |
| 4,883,366 A | * | 11/1989 | Dohi ...................... | G01K 7/343 374/184 |
| 5,007,284 A | * | 4/1991 | Slone ................... | G01M 13/005 73/114.78 |
| 8,449,180 B2 | * | 5/2013 | Sandhu .................... | G01K 7/22 374/185 |
| 9,459,156 B2 | * | 10/2016 | Ballandras .............. | H03H 9/15 |
| 10,476,284 B2 | * | 11/2019 | Suzuki .................... | H02J 50/80 |
| 10,901,460 B2 | * | 1/2021 | von Badinski ....... | G06F 1/1635 |

(Continued)

FOREIGN PATENT DOCUMENTS

DE      102016101115 A1    8/2016

OTHER PUBLICATIONS

International Search Report, International Application No. PCTIB2019/057853, International Filing Date, dated Sep. 18, 2019.

*Primary Examiner* — Phallaka Kik

(57) ABSTRACT

A charging inlet includes a power terminal, a holder member, and a thermal sensor. The power terminal is configured to releasably engage a mating contact of an external power source. The holder member is proximate to the power terminal, and has an electrically insulative material. The holder member defines at least a portion of a pocket that is fully enclosed. The thermal sensor is disposed within the pocket for monitoring a temperature of the power terminal.

20 Claims, 5 Drawing Sheets

(56) References Cited

U.S. PATENT DOCUMENTS

| | | | |
|---|---|---|---|
| 2002/0034682 A1* | 3/2002 | Moores, Jr. | H01M 10/46 429/120 |
| 2009/0195237 A1 | 8/2009 | Feliss et al. | |
| 2009/0274952 A1* | 11/2009 | Wood | H01M 2/1205 429/99 |
| 2010/0181966 A1* | 7/2010 | Sakakibara | H01M 10/443 320/136 |
| 2011/0234160 A1* | 9/2011 | Smith | H02J 7/00043 320/110 |
| 2012/0262109 A1* | 10/2012 | Toya | H01M 10/44 320/108 |
| 2015/0147918 A1* | 5/2015 | Matsuda | H01R 13/5841 439/694 |
| 2016/0006156 A1* | 1/2016 | Shimizu | H01R 4/72 439/310 |
| 2016/0018270 A1* | 1/2016 | Wernsman | G01K 13/00 374/117 |
| 2016/0072213 A1* | 3/2016 | Ichio | B60L 53/16 439/34 |
| 2016/0107530 A1 | 4/2016 | Roberts et al. | |
| 2016/0221458 A1* | 8/2016 | Lopez | H05K 7/20927 |
| 2017/0110760 A1* | 4/2017 | Hatta | H01M 10/056 |
| 2020/0064207 A1* | 2/2020 | Yang | G01K 1/16 |
| 2020/0067237 A1* | 2/2020 | Sarraf | G01K 7/42 |
| 2020/0083701 A1* | 3/2020 | Myer | B60L 53/16 |
| 2020/0094689 A1* | 3/2020 | Myer | B60L 53/302 |

* cited by examiner

CHARGING INLET WITH THERMAL SENSOR

BACKGROUND

The subject matter herein relates to electrical charging systems that have electrical connectors for establishing conductive pathways for supplying current from power sources to batteries.

Electric vehicles, including fully electric and plug-in hybrid vehicles, have electrical charging systems for charging batteries that provide current used to propel the vehicles. The charging systems include a charging inlet on the vehicle that releasably couples to a mating connector connected to an external power source. Because the vehicle is immobilized during charging operations, there is a desire to reduce the duration of charging operations to reduce the amount of time that the vehicle is immobile. The charging duration can be reduced by increasing the rate of power (e.g., electric current) transfer. At high currents, components of the vehicle charging system, such as the charging inlet, may heat up due to electrical contact resistances. If left unchecked, the heat can damage the components of the charging system, such as by melting the components, and could potentially start a fire.

To prevent heat-related damage, some known charging systems have sensors for monitoring the temperature in or around the charging inlet. If the temperature that is measured exceeds a threshold, the charging systems automatically reduce the power transfer rate and/or take other actions to maintain the temperature at a safe level that is unlikely to cause damage. However, the temperature sensors in known charging systems may be inaccurate and/or have a delayed response times. For example, to provide electrical isolation for the sensing circuitry from the high current conveyed through power contacts, the temperature sensors may be positioned relatively far away from the power contacts and/or placed behind walls or other structures. But, the separation distance and intervening structures result in a significant temperature disparity between the power contacts and the temperature sensors, reducing the accuracy and slowing the response time of the sensors. As a result of the low accuracy and slow response time, known charging systems have limited control over the charging operation.

A need remains for a charging inlet having a thermal sensor that can more accurately and quickly monitor the temperature of the power contacts during a charging operation than known charging systems, allowing for greater power transfer rates during charging operations to reduce the charging duration without concern of causing heat-related damage.

SUMMARY

In one or more embodiments of the present disclosure, a charging inlet is provided that includes a power terminal, a holder member, and a thermal sensor. The power terminal is configured to releasably engage a mating contact of an external power source. The holder member is proximate to the power terminal, and has an electrically insulative material. The holder member defines at least a portion of a pocket that is fully enclosed. The thermal sensor is disposed within the pocket for monitoring a temperature of the power terminal.

In one or more embodiments, a charging inlet is provided that includes first and second power terminals, a holder member, and first and second thermal sensors. The first and second power terminals are spaced apart from each other and configured to releasably engage corresponding mating contacts of an external power source. The holder member extends between the first and second power terminals, and has an electrically insulative material. The holder member defines at least a portion of a first pocket located proximate to the first power terminal and a second pocket that is spaced apart from the first pocket and located proximate to the second power terminal. The first and second pockets are fully enclosed. The first thermal sensor is disposed within the first pocket for monitoring a temperature of the first power terminal. The second thermal sensor is disposed within the second pocket for monitoring a temperature of the second power terminal.

In one or more embodiments, a charging inlet is provided that includes a power terminal, a secondary lock, a tray, and a thermal sensor. The power terminal is configured to releasably engage a mating contact of an external power source. The power terminal includes a flange. The secondary lock has an electrically insulative material. The secondary lock overlaps and backs up the flange of the power terminal to secure the power terminal in a fixed position within the charging inlet. The secondary lock has a slot that extends inward from an opening along an outer surface of the secondary lock. The slot defines at least a portion of a pocket that is fully enclosed. The tray is loaded into the slot of the secondary lock. The thermal sensor is mounted on the tray, and is disposed within the pocket for monitoring a temperature of the power terminal.

DETAILED DESCRIPTION

Figure 1:
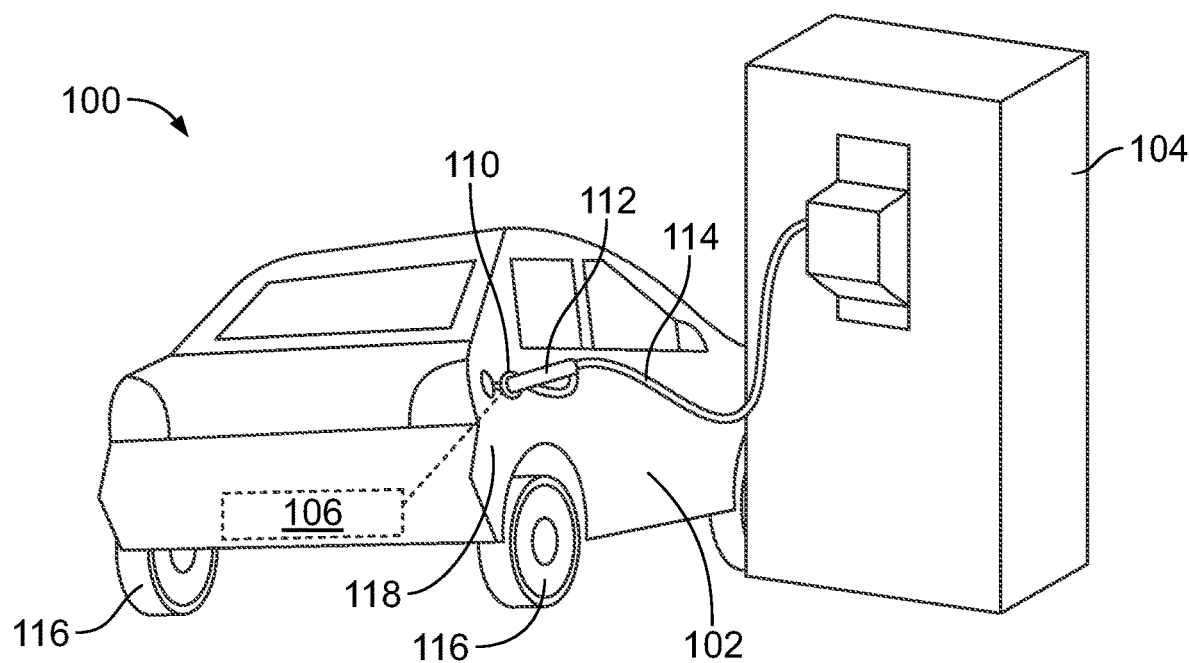
FIG. 1 illustrates a charging system that includes an electric vehicle parked next to a charging station according to an embodiment.

FIG. 1 illustrates a charging system 100 that includes an electric vehicle 102 parked next to a charging station 104 according to an embodiment. The electrical vehicle 102 includes an onboard battery pack 106 that is electrically connected to an onboard charging inlet 110. The battery pack 106 is illustrated in phantom in FIG. 1. The vehicle 102 may be a fully electric vehicle that lacks a combustion engine, a plug-in hybrid that includes both the battery pack 106 and a combustion engine, or the like. The battery pack 106 supplies electrical power (e.g., current) for powering a traction motor (not shown) of the vehicle 102 to provide tractive effort to the drivetrain and wheels 116. The tractive effort propels the vehicle 102 along a route. Optionally, the traction motor may be selectively functional as a generator when tractive effort is not desired, such as when driving downhill, to generate electrical energy for charging the battery pack 106 using regenerative braking. The battery pack 106 may represent an array of batteries and/or battery cells. Although the electric vehicle 102 is illustrated as a passenger automobile in FIG. 1, the embodiments of the charging inlet 110 described herein are not limited to use with passenger automobiles and may be installed on other types of vehicles, such as buses, trucks, rail vehicles, marine vessels, or the like.

The charging inlet 110 is configured to connect with a mating connector of an external power source to recharge the battery pack 106. In the illustrated embodiment, the charging station 104 represents the external power source, and a plug connector 112 represents the mating connector. When the vehicle 102 is not proximate to a charging station 104, other external power sources that can be used to connect to the charging inlet 110 for recharging the battery pack 106 include home electrical outlets, external generators, and the like. The mating plug connector 112 is coupled to the charging station 104 via an electrical power cable 114.

The charging inlet 110 is mounted to a side 118 of the vehicle 102 in the illustrated embodiment. The charging inlet 110 has a mating interface that releasably couples directly to the mating plug connector 112 to establish an electrical connection for conducting current from the charging station 104 to the battery pack 106. The charging inlet 110 may have a locking device (not shown) that releasably secures the mating connector 112 in a mated position with the charging inlet 110 to prevent premature disconnection of the mating plug connector 112 from the charging inlet 110.

Figure 2:
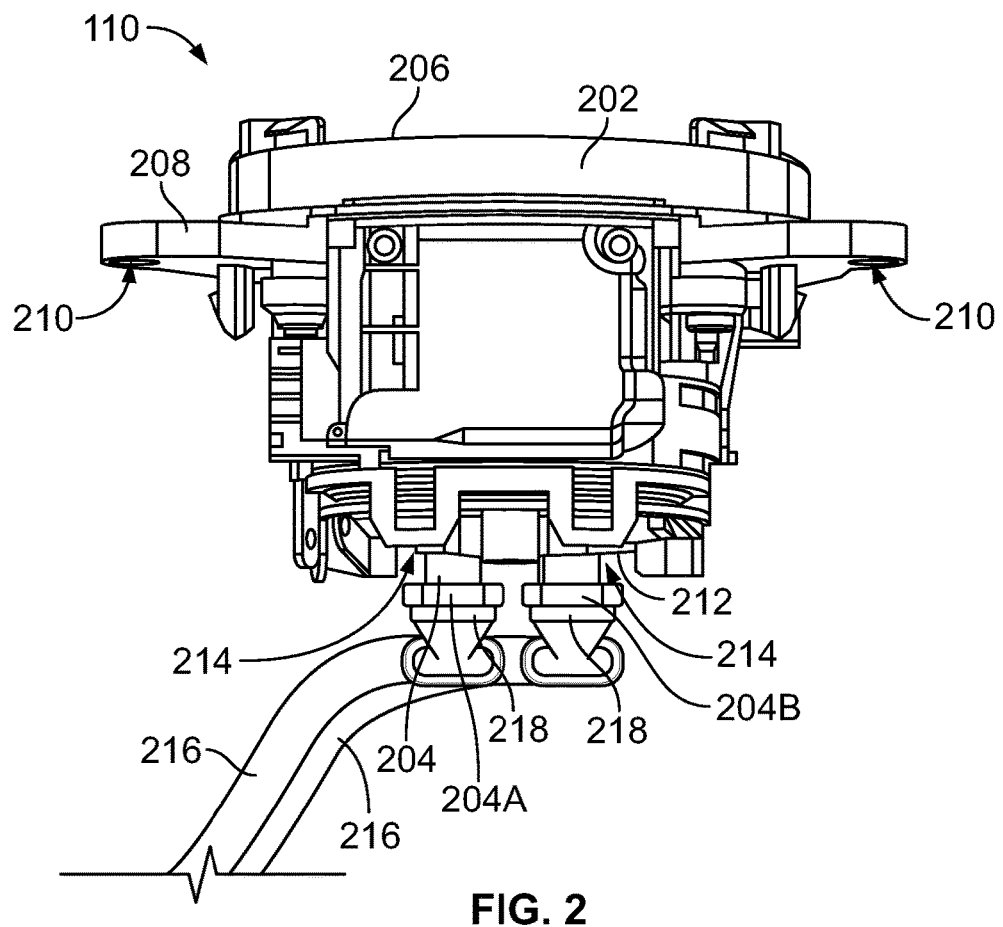
FIG. 2 is a top down view of a charging inlet according to an embodiment.

FIG. 2 is a top down view of the charging inlet 110 according to an embodiment. The charging inlet 110 includes a housing 202 and electrical power terminals 204 held by the housing 202. The housing 202 has a mating side 206 that couples to the mating connector 112 (shown in FIG. 1). For example, the mating side 206 has an interface that complements an interface of the mating connector 112. The housing 202 may include a mounting flange 208 that is used for mounting the charging inlet 110 to the vehicle 102 (shown in FIG. 1). For example, the mounting flange 208 may define apertures 210 that receive fasteners therethrough to secure the charging inlet 110 to a panel of the vehicle 102, such as a body panel or a chassis wall. The housing 202 extends from the mating side 206 to a back side 212 that is opposite the mating side 206. The housing 202 defines channels 214 that extend from the back side 212 to the mating side 206. As used herein, relative or spatial terms such as "front," "rear," "back," "top," "bottom," "inner," and "outer" are only used to identify and distinguish the referenced elements in the illustrated orientations shown in the figures and do not necessarily require particular positions or orientations relative to gravity and/or the surrounding environment of the charging inlet 110.

The charging inlet 110 has two power terminals 204—a first power terminal 204A and a second power terminal 204B—in the illustrated embodiment, but may have a different number of power terminals 204 in other embodiments. The power terminals 204 extend into different corresponding channels 214 of the housing 202. Portions of the power terminals 204 project outside of the channels 214 beyond the back side 212 of the housing 202. Each of the power terminals 204 is mechanically secured to a different corresponding power cable 216 to electrically connect the respective power terminal 204 to the corresponding power cable 216. The power cables 216 extend from the power terminals 204 towards the battery pack 106 (shown in FIG. 1), and are configured to convey electric current for charging the battery pack 106. The power terminals 204 engage one or more conductors 218 of the power cables 216 at interfaces. The interfaces may be located outside of the housing 202, as shown in FIG. 2. In an embodiment, the charging inlet 110 includes a cover 220 (shown in FIG. 3) that covers and encases the exposed interfaces when the cover 220 is assembled onto the housing 202.

Figure 3:
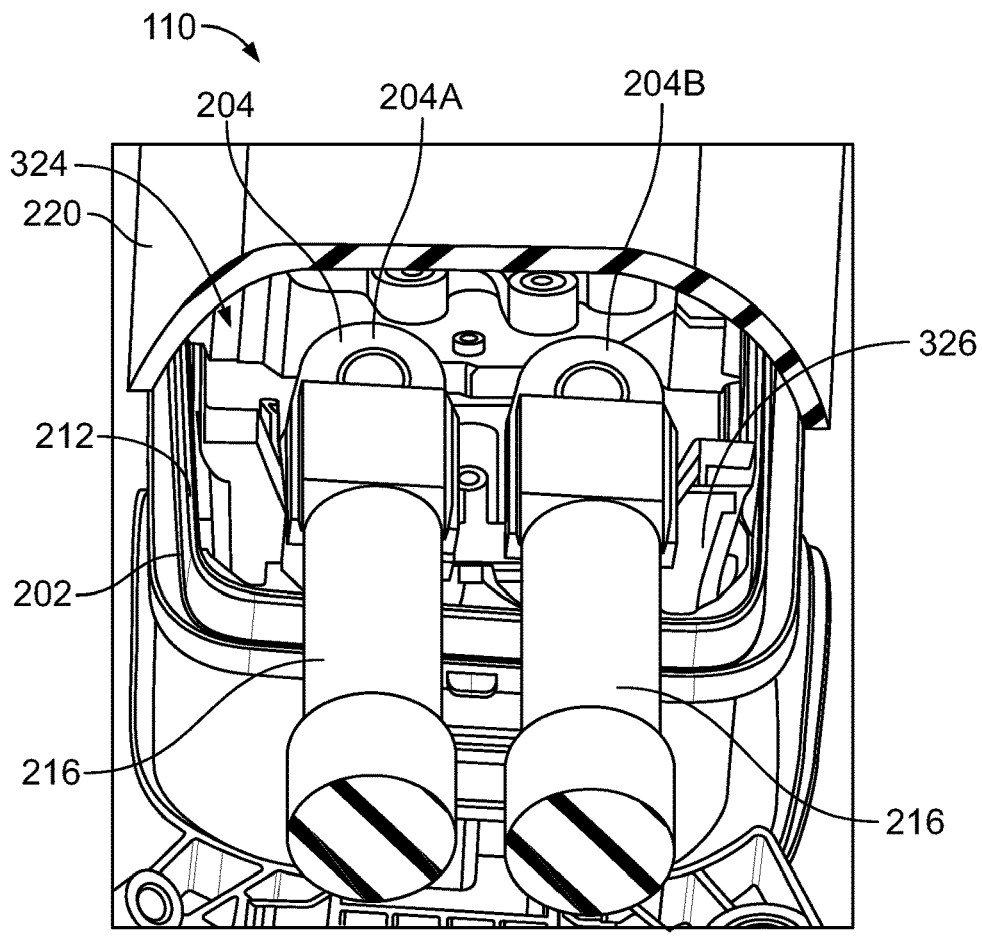
FIG. 3 is a bottom perspective view of a portion of the charging inlet according to an embodiment.

FIG. 3 is a bottom perspective view of a portion of the charging inlet 110 according to an embodiment. The perspective view shows the back side 212 of the housing 202. The cover 220 is mounted onto the housing 202 to enclose a cavity 324 of the charging inlet 110. The cavity 324 is defined by the housing 202 and the cover 220. The cover 220 is shown in cross-section in FIG. 3 for descriptive purposes to show the power terminals 204 that are located within the cavity 324. The power cables 216 may extend through one or more outlet openings (not shown) in the cover 220 to exit the cavity 324.

The power terminals 204 are configured to convey high power electrical energy (e.g., high voltage, high current, etc.). The power terminals 204 may be direct current (DC) fast charge terminals for conveying direct current at high current rates up to or exceeding 1000 A. The charging inlet 110 may include other power terminals held within the housing 202 in addition to the two power terminals 204. For example, although not shown in FIG. 3, the charging inlet 110 may include power terminals that convey alternating current (AC) at reduced power levels relative to the power levels conveyed by the power terminals 204.

The two power terminals 204A, 204B are spaced apart from each other. The charging inlet 110 in the illustrated embodiment includes a secondary lock 326. The secondary lock 326 is a discrete component that releasably mounts to the housing 202. The secondary lock 326 engages the power terminals 204 to secure the power terminals 204 in fixed positions relative to the housing 202. The secondary lock 326 has an electrically insulative material, such as a thermoplastic or the like. A portion of the secondary lock 326 may extend between the first and second power terminals 204A, 204B, which provides some electrical insulation to block electrical arcing and/or interference.

Figure 4:
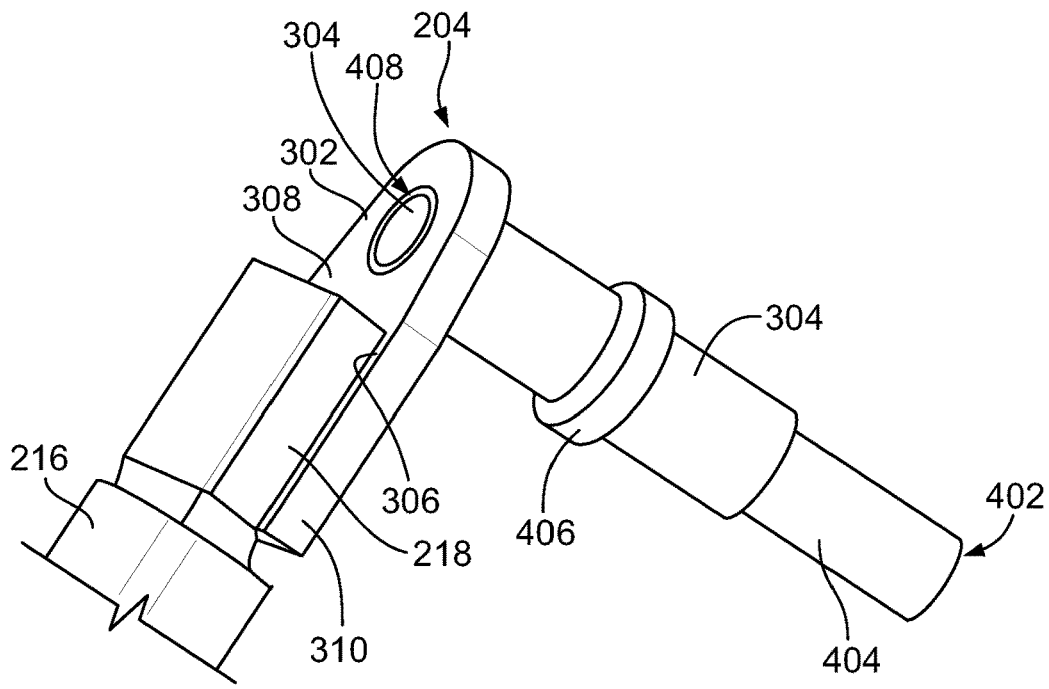
FIG. 4 is an isolated perspective view of a power terminal of the charging inlet according to an embodiment.

FIG. 4 is an isolated perspective view of one of the power terminals 204 of the charging inlet 110 according to an embodiment. The illustrated power terminal 204 may represent either of the first and second power terminals 204A, 204B shown in FIGS. 2 and 3. The power terminal 204 has a head 302 and a shaft 304 that projects from the head 302. The shaft 304 extends from the head 302 to a mating end 402 of the power terminal 204.

The head 302 is terminated (e.g., mechanically and electrically connected to) the one or more conductors 218 of the corresponding power cable 216. The head 302 may have a termination area 306 that is planar and engages the one or more conductors 218 via chemical bonding, such as welding, soldering, or the like. In a non-limiting example, the conductor(s) 218 of the power cable 216 are ultrasonically welded to the termination area 306 to irremovably mechanically couple and electrically connect the power cable 216 to the power terminal 204. The termination area 306 may be disposed along a rear side 308 of the respective head 302 that faces away from the shaft 304. In the illustrated embodiment, the head 302 includes an elongated tab 310 that projects outward from the location where the head 302 is connected to the shaft 304. The termination area 306 is located along the tab 310.

The shaft 304 defines a pin-shaped contact 404 that engages a complementary contact of the mating connector 112 (shown in FIG. 1), such as a socket contact. In an alternative embodiment, the shaft 304 may have another type of contact at the mating end 402, such as a blade, spring beam, socket, or the like. The shaft 304 optionally has a varying diameter along the length thereof due to various features of the shaft 304 and spacing tolerances within the housing 202 (shown in FIG. 3). For example, the shaft 304 in the illustrated embodiment has a flange 406 that radially extends outward and has a greater diameter than portions of the shaft 304 on either side of the flange 406.

The power terminal 204 is composed of one or more metals. In the illustrated embodiment, the head 302 of the power terminal 204 is a discrete component from the shaft 304. The shaft 304 is received into an opening 408 in the head 302 to mechanically couple the two components together. The shaft 304 may be threadably connected to helical threads within the opening 408, or connected via an interference fit, an adhesive, welding, or another chemical bonding. In an alternative embodiment, the power terminal 204 may be a unitary, monolithic structure such that the shaft 304 is integral to the head 302 without requiring a joining operation to couple the two components.

Figure 5:
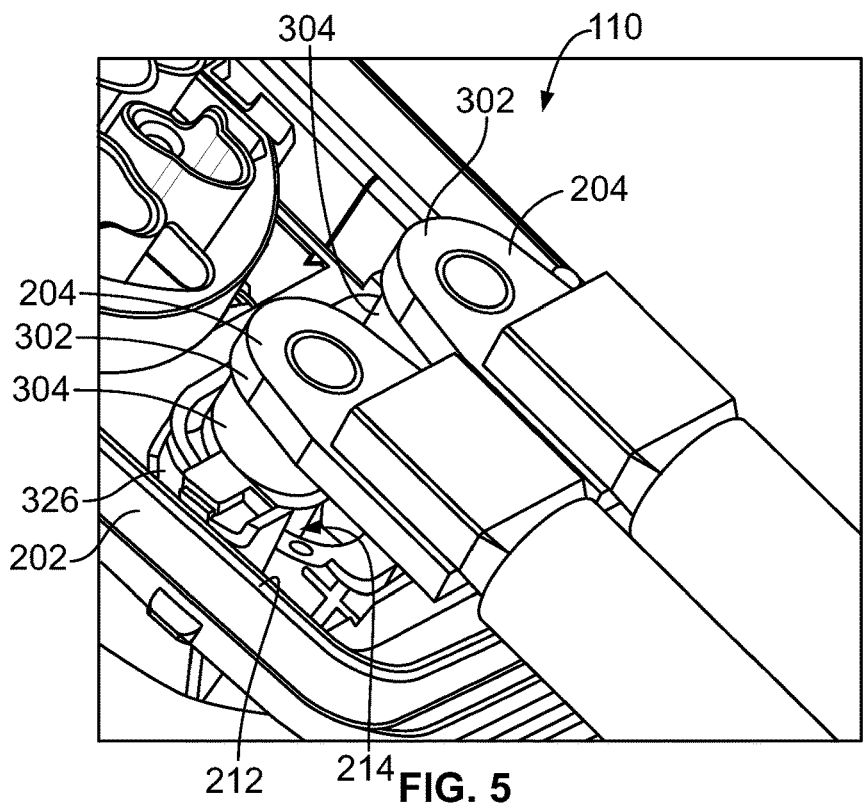
FIG. 5 is a side perspective view of a portion of the charging inlet according to an embodiment.

FIG. 5 is a side perspective view of a portion of the charging inlet 110 according to an embodiment. When the power terminals 204 are loaded into the housing 202, the shafts 304 of the power terminals 204 extend into the corresponding channels 214 of the housing 202, and the heads 302 are exposed outside of the back side 212 of the housing 202. The secondary lock 326 is mounted to the housing 202. The secondary lock 326 surrounds and engages the shafts 304 of the power terminals 204 to secure the power terminals 204 within the channels 214.

Figure 6:
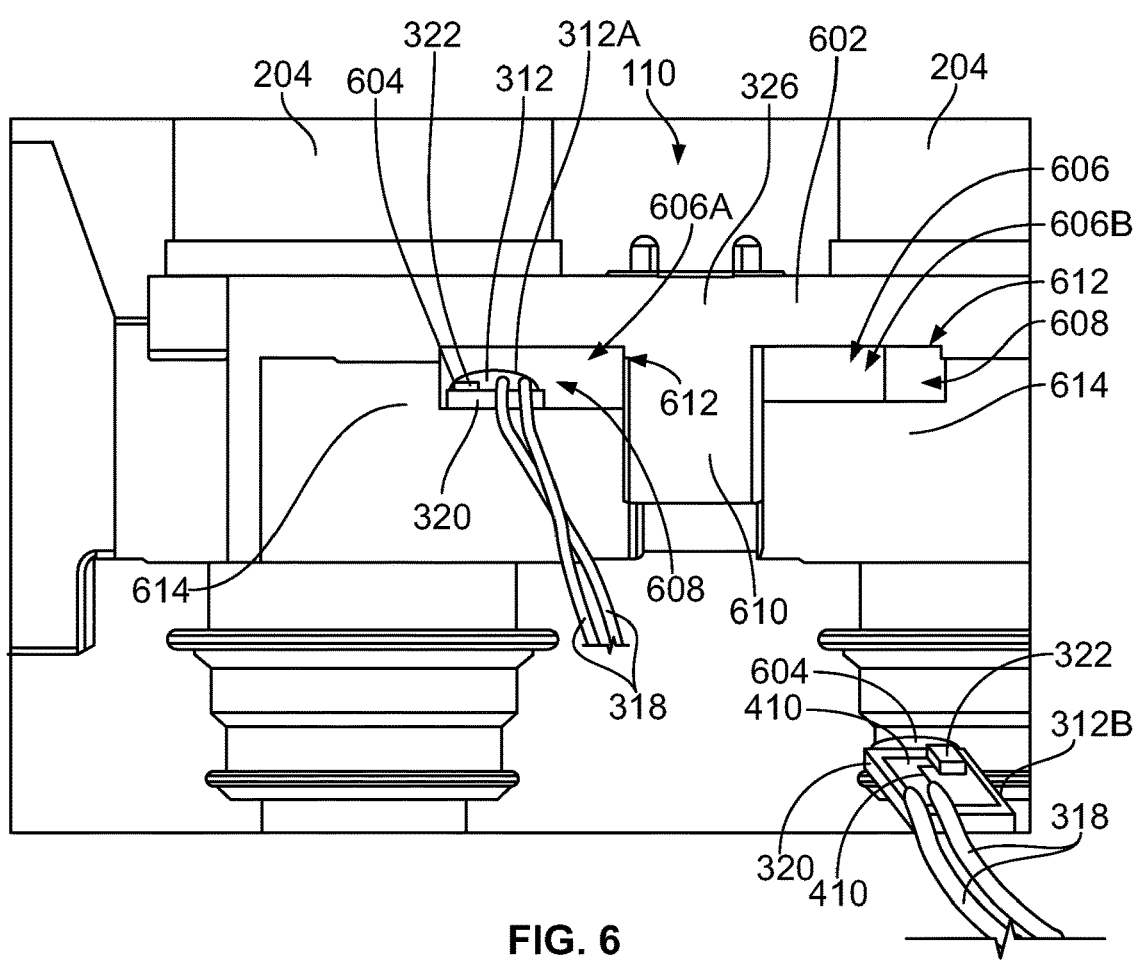
FIG. 6 is a side view of a portion of the charging inlet including a secondary lock and power terminals according to a first embodiment.

FIG. 6 is a side view of a portion of the charging inlet 110 including the secondary lock 326 and the power terminals 204 according to a first embodiment. The charging inlet 110 includes at least one thermal sensor 312 that measures and monitors a temperature within the charging inlet 110. The charging inlet 110 includes two thermal sensors 312 in the illustrated embodiment. The thermal sensors 312 are configured to be mounted to a holder member 602 that secures the thermal sensors 312 in fixed positions relative to the holder member 602. The holder member 602 is proximate to the power terminals 204 and holds the thermal sensors 312 nearby the power terminals 204 without directly engaging the power terminals 204. The holder member 602 has an electrically insulative material to insulate the thermal sensors 312 from the high power electrical current conveyed along the power terminals 204 for charging the battery pack 106 (shown in FIG. 1). For example, the electrically insulative material may be or include a composite material, a ceramic, a glass, a polymer, or the like. The holder member 602 defines at least a portion of one or more pockets 606. The thermal sensors 312 are disposed within the one or more pockets 606. In the illustrated embodiment, the holder member 602 defines at least a portion of two separate pockets 606A, 606B. A first pocket 606A is proximate to the first power terminal 204A, and a second pocket 606B is proximate to the second power terminal 204B.

In the illustrated embodiment, the holder member 602 is the secondary lock 326. The secondary lock 326 defines all or a portion of the pockets 606. The thermal sensors 312 are mounted to the secondary lock 326 within different corresponding pockets 606. For example, a first thermal sensor 312A of the two thermal sensors 312 is mounted within the first pocket 606A. The charging inlet 110 is shown in a partially assembled state or condition in FIG. 6 because only the first thermal sensor 312A is mounted to the secondary lock 326. The second thermal sensor 312B is poised for mounting to the secondary lock 326 via loading into the second pocket 606B.

When the charging inlet 110 is fully assembled and operational, the thermal sensors 312 may be communicatively connected to a control device (not shown) that is used to regulate the rate of current conveyed along the power terminals 204 during a charging operation to reduce the risk of damage related to overheating. For example, during the charging operation the power terminals 204 generate heat due to electrical resistances. The thermal sensors 312 measure the temperature and generate temperature data that is conveyed as electrical signals to the control device.

The control device may include one or more processors that analyze the temperature data received from the thermal sensors to monitor the temperature within the charging inlet 110. If the temperature data indicates that the temperature within the charging inlet 110 exceeds a first designated threshold, the control device may be programmed to automatically reduce (e.g., slow) the rate of power transfer during the charging operation to reduce the amount of heat generated and allow heat within the charging inlet 110 to dissipate. Conversely, if the temperature is determined to be below a second designated threshold that is at a lower temperature than the first threshold, the control device may be programmed to automatically increase the rate of power transfer during the charging operation. The increased power transfer rate beneficially reduces the length of time required for the battery pack 106 (shown in FIG. 1) to charge, allowing for the vehicle 102 (shown in FIG. 1) to be operable again for traveling in a shorter amount of time. In order to provide improved control over the charging operation to enable fast charge times with low risk of overheating, the thermal sensors 312 described herein provide more accurate temperature measurements and/or quicker response times (e.g., reduced delays) than the temperature sensors within known charging inlets.

The first thermal sensor 312A is disposed proximate to the first power terminal 204A. Once mounted to the secondary lock 326, the second thermal sensor 312B is disposed proximate to the second power terminal 204B. As a result, the temperature measured by the first thermal sensor 312A may reflect the temperature of the first power terminal 204A, and the temperature measured by the second thermal sensor 312B may reflect the temperature of the second power terminal 204B.

The first and second thermal sensors 312A, 312B may have the same size and components as one another. The thermals sensors 312 include a substrate 320 and a sensing element 322 mounted on the substrate 320. The sensing element 322 may be configured to measure the temperature of immediate environment of the sensing element 322 based on an electrical resistance of the sensing element 322. The sensing element 322 may be or include a thermistor, a thermocouple, a resistance temperature detector (RTD), or the like. Optionally, at least a portion of the sensing element 322 may be formed via screen-printing directly onto the substrate 320. Although each of the thermal sensors 312A, 312B has only one sensing element 322 in FIG. 6, the thermal sensors 312 alternatively may include multiple sensing elements 322 spaced apart from one another on the respective substrate 320.

The substrates 320 may have material properties that enable the substrates 320 to provide electrical insulation between the corresponding sensing elements 322 and the adjacent power terminals 204. The substrate 320 may be in the form of a film, panel, block, or sheet. The material of the substrate 320 may have heat-resistant properties, such as polyimide, aluminum nitride, silicon, a composite including fiberglass and epoxy resin, or the like. In a non-limiting example embodiment, the substrate 320 includes an aluminum nitride material, which has relatively high dielectric strength.

Optionally, the thermal sensors 312 include an epoxy layer 604 covering the sensing elements 322. The epoxy layer 604 may be or include an epoxy material that is electrically-insulative and thermally-conductive. The epoxy layer 604 may be applied onto the substrate 320 after forming or attaching the sensing element 322 to the substrate 320. The epoxy layer 604 surrounds and encapsulates the sensing element 322 to protect the sensing element 322 from debris and other contaminants. In an alternative embodiment, the thermal sensors 312 do not include the epoxy layers 604, and the sensing elements 322 are exposed on the substrates 320 to air in the surrounding environment.

The thermal sensors 312 may be electrically connected to the control device via wires 318. The wires 318 may be insulated to electrically isolate the electrical signals from interference caused by the high electrical power conveyed along the power terminals 204 for charging the battery pack 106 (shown in FIG. 1). The wires 318 are electrically terminated to the substrates 320 via soldering, through-hole mounting, discrete connectors, or the like. The wires 318 are electrically connected to the sensing elements 322 via conductive elements 410, such as traces, on the substrates 320. The conductive elements 410 may be exposed along a surface of the substrate 320 or recessed relative to the surface and encased within the material of the substrate 320. The conductive elements 410 convey electrical signals representing temperature data from the sensing element 322 to the wires 318 for remote communication to the control device.

In an alternative embodiment, instead of the wires 318, the thermal sensors 312 may include passive or active communication circuitry for wirelessly communicating the temperature data to the control device. For example, the communication circuitry may receive an activation signal communicated (e.g., transmitted or broadcast) from the control device, and may utilize energy from the activation signal to obtain an updated temperature measurement and generate a wireless response signal to the control device that includes the updated temperature measurement. The communication circuitry may be on the substrate 320, and may be connected to the sensing elements 322 via the conductive elements 410.

In the illustrated embodiment, the secondary lock 326, representing the holder member 602, defines two slots 608 that are spaced apart by an intervening segment 610 of the secondary lock 326. Each of the two slots 608 projects into the secondary lock 326 from a respective opening 612 along a perimeter surface 614 of the secondary lock 326. The thermal sensors 312 are disposed into the slots 608. The thermal sensors 312 may be loaded into the slots 608 during assembly through the openings 612. The substrate 320 of each thermal sensor 312 may be attached to an interior wall of the corresponding slot 608 to secure the thermal sensor 312 in place. For example, an adhesive, a fastener, an interference fit, a latch, or the like, may be utilized to secure the substrates 320 within the slots 608.

The interior walls of the slots 608 define at least portions of pockets 606. When the charging inlet 110 is in the fully assembled condition or state, the pockets 606 may be fully enclosed in order to isolate air (or other material) within the pockets 606 from air within the charging inlet 110 outside of the pockets 606, as described in more detail herein.

Figure 7:
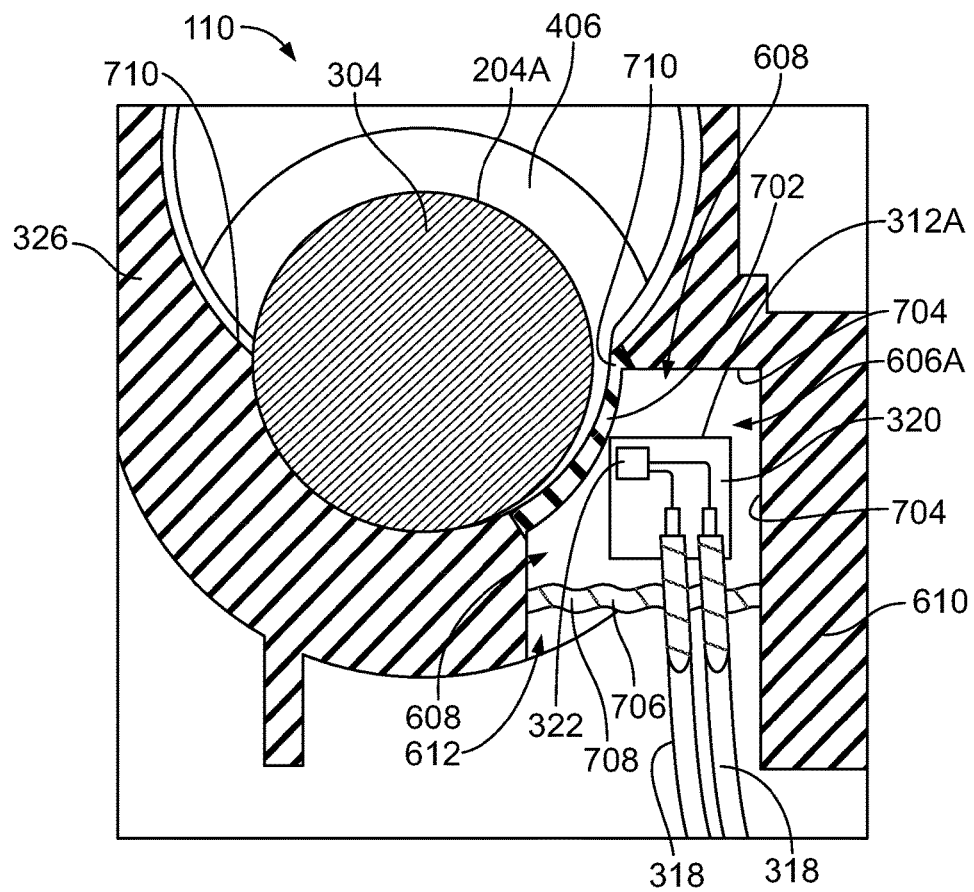
FIG. 7 is a cross-sectional view of a portion of the charging inlet according to the embodiment shown in FIG. 6.

FIG. 7 is a cross-sectional view of a portion of the charging inlet 110 according to the embodiment shown in FIG. 6. The cross-section is taken along a line that extends through the shaft 304 of the first power terminal 204A and the secondary lock 326. The charging inlet 110 is shown in the assembled condition or state. The first thermal sensor 312A is mounted within the first pocket 606A proximate to the first power terminal 204A. Although only one thermal sensor 312A and one pocket 606A is shown in FIG. 7, the other thermal sensor 312B and the other pocket 606B may be similar. For example, the thermal sensors 312A, 312B and pockets 606A, 606B may mirror one another across the intervening segment 610 of the secondary lock 326.

The first pocket 606A is partially defined by the slot 608 in the secondary lock 326. The pocket 606A is fully enclosed, which blocks convective heat transfer into and out of the pocket 606A. The pocket 606A is proximate to the power terminal 204A, and the air (or other material) within the pocket 606A can heat up to an equilibrium temperature faster than the air within the charging inlet 110 that is outside of the pocket 606. For example, air within the pocket 606A may increase faster than the volume of air within the cavity 324 (shown in FIG. 3) of the charging inlet 110. Optionally, the pocket 606A may be filled with a material other than air to allow for improved thermal conductivity (relative to filling the pocket 606A with air). For example, the material within the pocket 606A may be an injectable sealant with a relatively high thermal conductivity, such as greater than 1 Watts per meter-Kelvin (W/mK). Alternatively, the pocket 606A may be filled with a gas other than air.

As shown in FIG. 7, the secondary lock 326 has an interior rim 710 that extends around at least a portion of the circumference of the shaft 304. The interior rim 710 overlaps and backs up the flange 406 of the power terminal 204A to secure the power terminal 204A in a fixed position within the charging inlet 110.

The thermal sensor 312A within the pocket 606A is separated from the power terminal 204A by a divider wall 702. The divider wall 702 may be a portion of the secondary lock 326, such as a segment of the interior rim 710. The divider wall 702 may allow heat transfer from the power terminal 204A to the pocket 606A via radiation and/or conduction. The divider wall 702 represents a portion of the perimeter of the pocket 606A. The remainder of the pocket 606A shown in FIG. 7 is defined by interior walls 704 of the secondary lock 326 (which define boundaries of the slot 608) and a back wall 706 that covers the opening 612 of the slot 608. The pocket 606A according to one or more embodiments is fully enclosed, such that fluid flow into and out of the pocket 606A is prohibited.

The back wall 706 is defined by a sealant 708 in the illustrated embodiment. The sealant 708 may be formed or applied after the thermal sensor 312A is loaded into the slot 608. The sealant 708 covers the opening 612 to enclose the pocket 606A. The sealant 708 blocks the flow of air and other gases across the opening 612 to prevent convective heat transfer into and out of the pocket 606A. The sealant 708 may be an epoxy or the like.

The thermal sensors 312 of the charging inlet 110 may be able to provide more accurate temperature measurements and/or quicker response times (e.g., less lag or delay) than known temperature sensing systems of charging inlets. For example, air (or other material) within the enclosed pockets 606 heats up via conductive and radiative heating from the power terminals 204. The sensing elements 322 of the thermal sensors 312 monitor the temperature of the power terminals 204 by measuring the temperature of the air (or other material) within the corresponding pockets 606. The air within the pockets 606 may heat up quicker than the air within the charging inlet 110 that is outside of the pockets 606. Therefore, by measuring the temperature of relatively small, isolated volumes of air in the pockets 606 that heat up quickly in response to heating from the power terminals 204, the thermal sensors 312 can provide quick response times to temperature increases. Furthermore, the insulation provided by the divider wall 702 may allow the thermal sensors 312 to be located closer to the power terminals 204 than the thermal sensors of known charging inlets and/or with reduced thermal gradient between the power terminals 204 and the thermal sensors 312, enabling more accurate temperature measurements than known temperature sensors.

Optionally, the sensing element 322 of the thermal sensor 312A may be off-center relative to the substrate 320. For example, the sensing element 322 may be located along a section of the substrate 320 more proximate to the power terminal 204A than the center of the sensing element 322 to reduce the distance between the sensing element 322 and the power terminal 204A.

The electrical wires 318 extend from the thermal sensor 312A outside of the pocket 606A for conveying electrical signals representing temperature data from the thermal sensor 312A for analysis (e.g., by a control device). The electrical wires 318 may penetrate the sealant 708. The sealant 708 may surround and encase the portions of the wires 318 that penetrate through the sealant 708.

Figure 8:
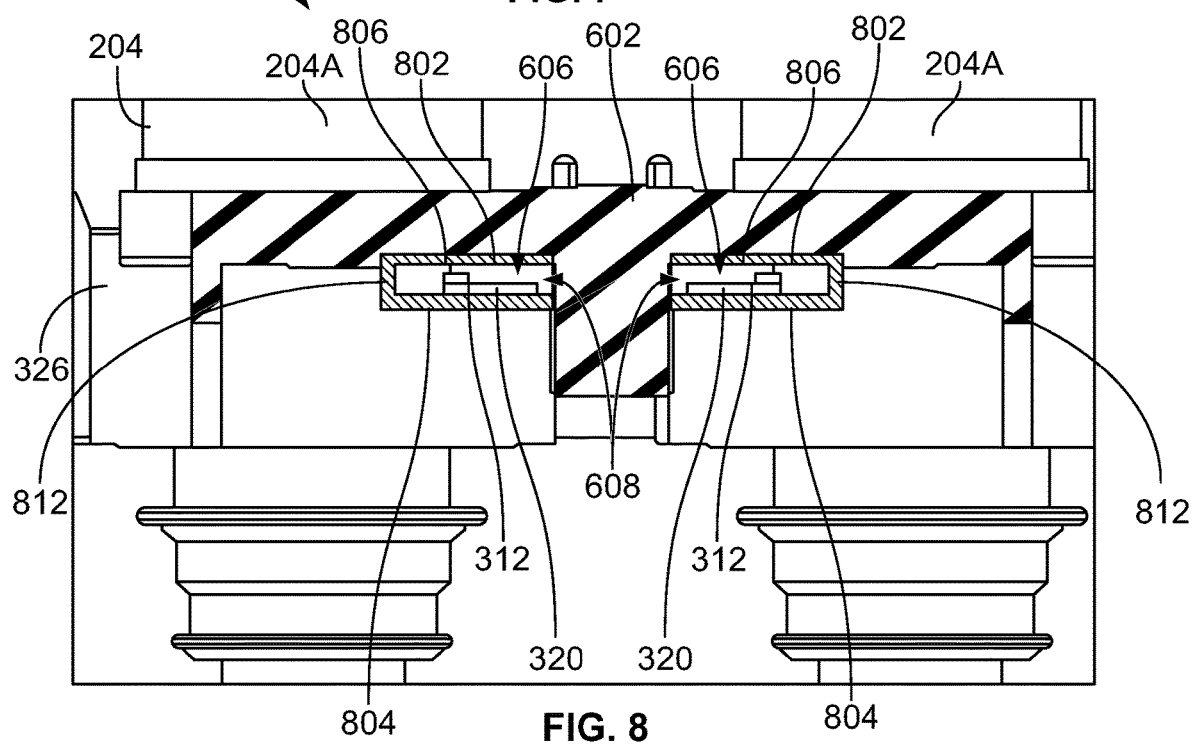
FIG. 8 is a side cross-sectional view of a portion of the charging inlet including the secondary lock and the power terminals according to a second embodiment.

FIG. 8 is a side cross-sectional view of a portion of the charging inlet 110 including the secondary lock 326 and the power terminals 204 according to a second embodiment. The illustrated embodiment differs from the embodiment shown in FIGS. 6 and 7 because the thermal sensors 312 are mounted on corresponding trays 802. The trays 802 extend into the pockets 606 and define portions of the pockets 606. For example, two trays 802 are shown in FIG. 8, and each tray 802 is disposed within a different one of the slots 608 of the secondary lock 326 that represents the holder member 602. The trays 802 define portions of the pockets 606. The cross-section line in FIG. 8 extends through a portion of the secondary lock 326 and the two trays 802.

Figure 9:
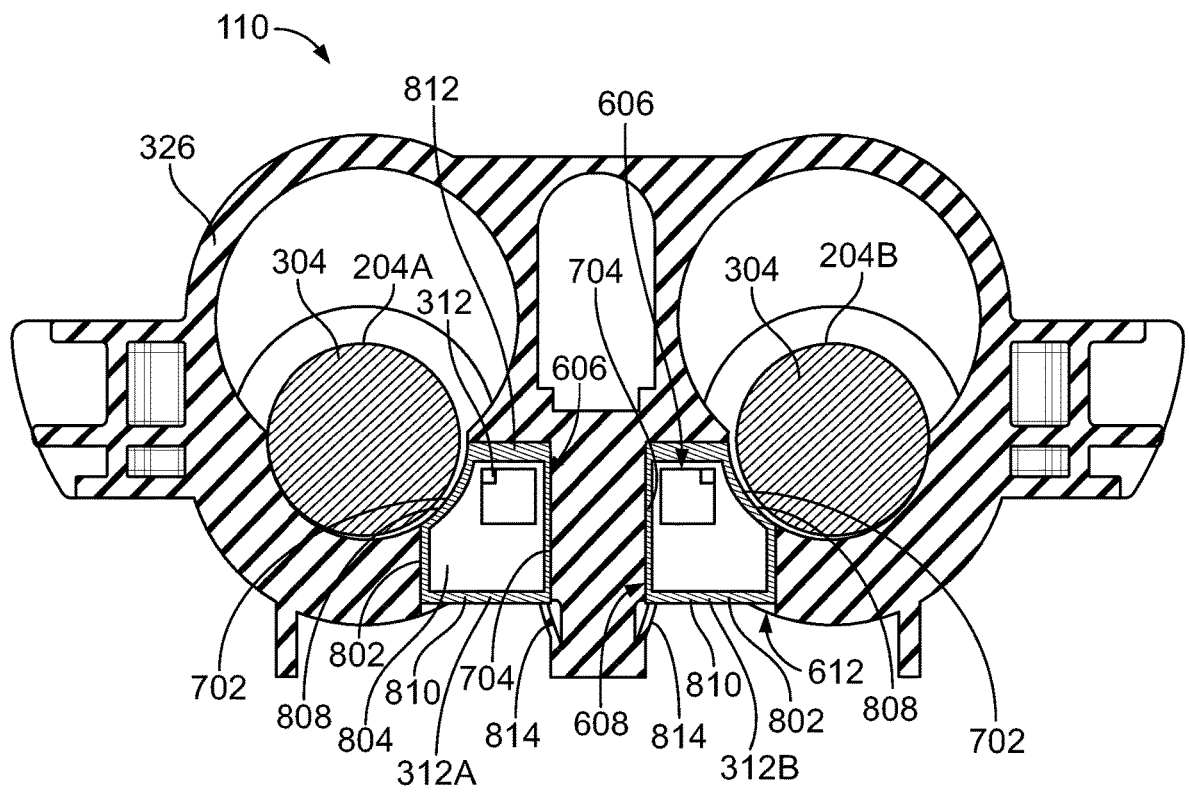
FIG. 9 is a top-down cross-sectional view of a portion of the charging inlet according to the embodiment shown in FIG. 8.

FIG. 9 is a top-down cross-sectional view of a portion of the charging inlet 110 according to the embodiment shown in FIG. 8. The cross-section line in FIG. 9 extends through the shafts 304 of the two power terminals 204A, 204B, the secondary lock 326, and the trays 802. The following description refers to both FIGS. 8 and 9.

In the illustrated embodiment, each tray 802 has a bottom wall or panel 804. The thermal sensors 312 are mounted to the trays 802 such that the substrate 320 of the thermal sensor 312 engages and is affixed to the bottom wall 804. As shown in FIG. 8, the trays 802 also may have a top wall 806 extending above the corresponding thermal sensor 312. Alternatively, the substrate 320 may be affixed to the top wall 806 instead of the bottom wall 804. The top wall 806 is optional, and the trays 802 may lack top walls in another embodiment.

The trays 802 have one or more walls extending from the bottom wall 804 to the top wall 806. For example, as shown in FIG. 9, each tray 802 has a side wall 808 that represents the divider wall 702 that divides the thermal sensor 312 from the corresponding power terminal 204. For example, the slots 608 of the secondary lock 326 optionally may be open to the power terminals 204. The side wall 808 of the tray 802 separates the corresponding thermal sensor 312 from the power terminal 204. Each tray 802 in the illustrated embodiment also includes a back wall 810 that covers the opening 612 of the slot 608 to enclose the pocket 606. The trays 802 optionally include additional side walls 812 for structural support and/or to seal the pockets 606.

The trays 802 may include an electrically insulative and thermally conductive material, such as a glass, ceramic, composite (e.g., glass epoxy), or the like. As non-limiting examples, the trays 802 may include aluminum nitride, boron nitride, silicone carbide, beryllium oxide, or the like.

The trays 802 enable the thermal sensors 312 to be assembled remote from the secondary lock 326, and subsequently coupled to the secondary lock 326 in a package. For example, after affixing the thermal sensors 312 to the trays 802, each tray 802 may be inserted into the corresponding slot 608 through the opening 612. The trays 802 optionally may latch into position within the slots 608 to couple the trays 802 to the secondary lock 326. For example, the secondary lock 326 may include deflectable latch fingers 814 that engage and catch on the trays 802 once the trays 802 extend beyond the latch fingers 814 to releasably secure the trays 802 (and the thermal sensors 312) within the slots 608. The latch fingers 814 in FIG. 9 engage the back walls 810 of the trays 802.

Similar to the embodiment shown in FIGS. 6 and 7, the pockets 606 surrounding the thermal sensors 312 may be fully enclosed when the charging inlet 110 is fully assembled. For example, after the trays 802 are fully loaded into the slots 608, the walls of the trays 802 and the interior walls 704 of the secondary lock 326 may seal the pockets 606. The back walls 810 may be sized to seal against the interior walls 704 of the secondary lock 326 to block air flow through the opening 612 of the slot 608. Optionally, a sealant may be applied at seams and interfaces between the trays 802 and the secondary lock 326 to seal the openings 612.

The thermal sensors 312 shown in FIGS. 8 and 9 do not have wires like the wires 318 shown in FIGS. 6 and 7 because the thermal sensors 312 have wireless communication circuitry configured to wirelessly communicate electrical signals representative of temperature data to a control device for analysis. Alternatively, if the thermal sensors 312 do have wires, the wires may extend through one or more openings in the back walls 810 of the trays 802.

As shown in FIG. 9, the first and second thermal sensors 312A, 312B are disposed between the first and second power terminals 204A, 204B. The thermal sensors 312 may be located in the space between the two power terminals 204 because this space may absorb heat from both power terminals 204 during a charging operation. The space between the power terminals 204 may experience some of the highest temperatures (if not the highest temperatures) of the charging inlet 110.

Figure 10:
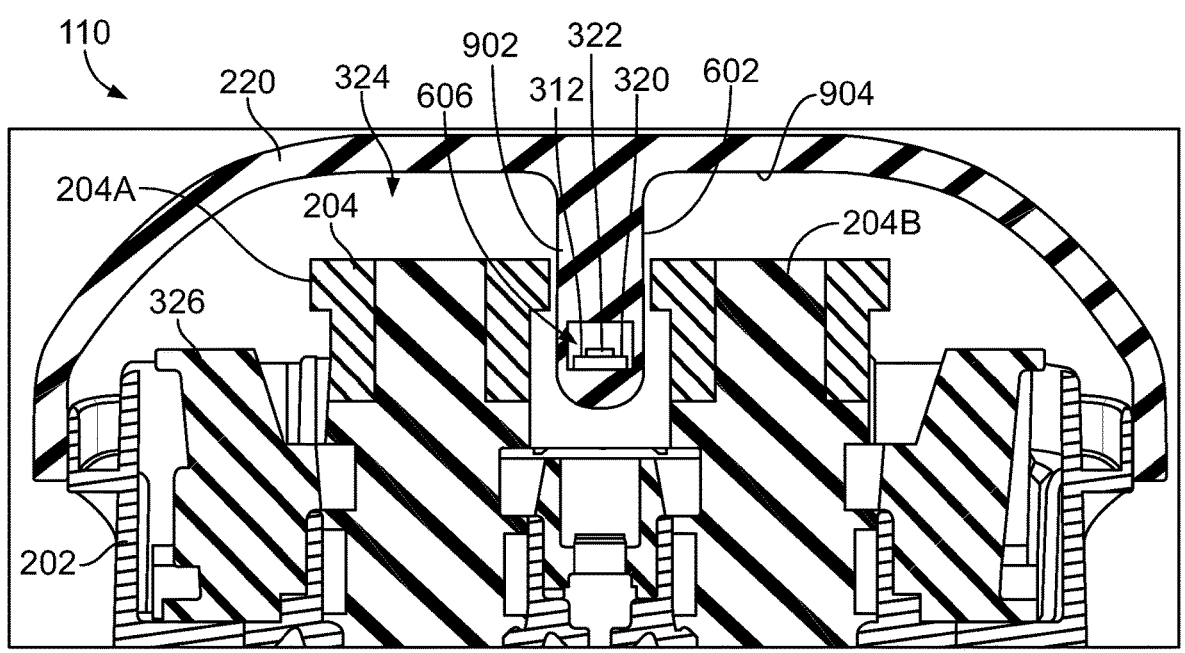
FIG. 10 is a cross-sectional view of a portion of the charging inlet according to a third embodiment.

FIG. 10 is a cross-sectional view of a portion of the charging inlet 110 according to a third embodiment. The cross-section line extends through the power terminals 204A, 204B, the secondary lock 326, the housing 202, and the cover 220. In the illustrated embodiment, the holder member 602 that holds the one or more thermal sensors 312 is an appendage 902 of the cover 220. The appendage 902 projects from an inner surface 904 of the cover 220 that faces towards the power terminals 204. The appendage 902 extends between the first and second power terminals 204A, 204B when the cover 220 is coupled to the housing 202, as shown in FIG. 10. The appendage 902 defines a pocket 606 in which a thermal sensor 312 is disposed. The pocket 606 and thermal sensor 312 are disposed between the two power terminals 204A, 204B. The thermal sensor 312 includes a sensing element 322 on a substrate 320, as described above with reference to other embodiments. The pocket 606 may be fully enclosed to enable the air within the pocket 606 to heat up quicker during a charging operation than the air within the cavity 324 of the charging inlet 110 that is outside of the pocket 606, yielding an accurate temperature measurement and a quicker response time than temperature sensors of known charging inlets. Although only one pocket 606 and one thermal sensor 312 are shown in the illustrated embodiment, the appendage 902 may define more than one pocket 606 to hold multiple thermal sensors 312 in another embodiment.

The holder member 602 that holds the thermal sensors 312 and defines at least portions of the pockets 606 is described in the embodiments presented herein as being the secondary lock 326 or an appendage 902 of the cover 220. But, in an alternative embodiment the holder member 602 may be a discrete component that is separate from the cover 220 and the secondary lock 326. For example, the holder member 602 may be a discrete plastic part that couples to the power terminals 204 between the secondary lock 326 and the cover 220.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet comprising:
a power terminal configured to releasably engage a mating contact of an external power source;
a holder member proximate to the power terminal, the holder member having an electrically insulative material, the holder member defining at least a portion of a pocket that is fully enclosed; and
a thermal sensor disposed within the pocket for monitoring a temperature of the power terminal, wherein the power terminal is outside of the pocket and the pocket is sealed to block air within the pocket surrounding the thermal sensor from mixing with air that is within the charging inlet outside of the pocket.

2. The charging inlet of claim 1, wherein the thermal sensor includes a substrate and a sensing element mounted on the substrate, the substrate including an aluminum nitride material.

3. The charging inlet of claim 1, wherein the thermal sensor in the pocket is separated from the power terminal by a divider wall that defines a segment of the pocket.

4. The charging inlet of claim 1, wherein the holder member is a secondary lock that is releasably mounted to a housing that holds the power terminal, wherein the secondary lock overlaps and backs up a flange of the power terminal to secure the power terminal in a fixed position relative to the housing.

5. The charging inlet of claim 1, wherein the pocket projects into the holder member from an opening along a perimeter surface of the holder member, wherein a sealant covers the opening to enclose the pocket.

6. The charging inlet of claim 1, further comprising a tray on which the thermal sensor is mounted, the tray extending into the pocket of the holder member.

7. The charging inlet of claim 6, wherein the pocket projects into the holder member from an opening along a perimeter surface of the holder member, wherein the tray has a back wall that covers the opening to enclose the pocket.

8. The charging inlet of claim 1, wherein the power terminal is a first power terminal and the charging inlet includes a second power terminal adjacent to the first power terminal, wherein the thermal sensor within the pocket is located between the first and second power terminals.

9. The charging inlet of claim 1, wherein the thermal sensor is mechanically and electrically connected to at least one electrical wire that extends from the thermal sensor outside of the pocket for conductively conveying electrical signals representing temperature data from the thermal sensor for analysis.

10. A charging inlet comprising:
first and second power terminals configured to releasably engage corresponding mating contacts of an external power source, the first and second power terminals spaced apart from each other;
a holder member extending between the first and second power terminals, the holder member having an electrically insulative material, the holder member defining at least a portion of a first pocket located proximate to the first power terminal and a second pocket that is spaced apart from the first pocket and located proximate to the second power terminal, wherein each of the first and second pockets is fully enclosed and is located between the first and second power terminals, the first and second power terminals being outside of the first and second pockets; and
first and second thermal sensors, the first thermal sensor disposed within the first pocket for monitoring a temperature of the first power terminal, the second thermal sensor disposed within the second pocket for monitoring a temperature of the second power terminal.

11. The charging inlet of claim 10, wherein the holder member is a secondary lock that is releasably mounted to a housing that holds the first and second power terminals, wherein the secondary lock overlaps and backs up a respective flange of each of the first and second power terminals to secure the first and second power terminals in fixed positions relative to the housing.

12. The charging inlet of claim 10, further comprising a housing that holds the first and second power terminals and a cover that couples to the housing to encapsulate the first and second power terminals, wherein the holder member is an appendage of the cover that projects between the first and second power terminals when the cover is coupled to the housing.

13. The charging inlet of claim 10, wherein a divider wall extends between the first power terminal and the first pocket to electrically insulate the first thermal sensor from the first power terminal.

14. The charging inlet of claim 10, wherein the first pocket projects into the holder member from an opening along a perimeter surface of the holder member, wherein a sealant covers the opening to enclose the pocket.

15. The charging inlet of claim 10, wherein the first pocket projects into the holder member from an opening along a perimeter surface of the holder member, wherein the first thermal sensor is mounted on a tray that extends into the first pocket, the tray including a back wall that covers the opening to enclose the first pocket.

16. The charging inlet of claim 15, wherein the holder member includes a deflectable latch that engages the tray to secure the tray within the first pocket.

17. The charging inlet of claim 10, wherein each of the first and second pockets is sealed to block air within the first pocket and air within the second pocket from mixing with each other and from mixing with air that is within the charging inlet outside of the first and second pockets.

18. A charging inlet comprising:
a housing,
a power terminal held by the housing and configured to releasably engage a mating contact of an external power source, the power terminal including a flange;
a secondary lock releasably mounted to the housing and comprising an electrically insulative material, the secondary lock overlapping and backing up the flange of the power terminal to secure the power terminal in a fixed position relative to the housing, the secondary lock having a slot that extends inward from an opening along an outer surface of the secondary lock, the slot defining at least a portion of a pocket that is fully enclosed;
a tray loaded in the slot of the secondary lock; and
a thermal sensor mounted on the tray, the thermal sensor disposed within the pocket for monitoring a temperature of the power terminal.

19. The charging inlet of claim 18, wherein the thermal sensor includes a substrate and a sensing element mounted on the substrate, the substrate including an aluminum nitride material.

20. The charging inlet of claim 18, wherein the tray has a bottom wall and a back wall projecting from the bottom wall, the back wall covering the opening of the secondary lock to enclose the first pocket.

* * * * *